(12) United States Patent
Cheng

(10) Patent No.: US 7,007,875 B2
(45) Date of Patent: Mar. 7, 2006

(54) ELECTRIC PEPPER MILL

(76) Inventor: Shun-I Cheng, No. 595, Section 2, Chang-Shi Street, Tainan City (TW)

(*) Notice: Subject to any disclaimer, the term of this patent is extended or adjusted under 35 U.S.C. 154(b) by 575 days.

(21) Appl. No.: 10/261,764

(22) Filed: Oct. 2, 2002

(65) Prior Publication Data
US 2004/0065213 A1    Apr. 8, 2004

(51) Int. Cl.
*A47J 42/04* (2006.01)
(52) U.S. Cl. .................................. 241/169.1
(58) Field of Classification Search ............ 241/168, 241/169, 169.1, 169.2
See application file for complete search history.

(56) References Cited

U.S. PATENT DOCUMENTS 5,022,591 A * 6/1991 Sanders ............ 241/169.1
5,865,384 A * 2/1999 Pai ..................... 241/93
6,830,206 B1 * 12/2004 Yang .................. 241/169.1

* cited by examiner

*Primary Examiner*—Mark Rosenbaum
(74) *Attorney, Agent, or Firm*—Rosenberg, Klein & Lee

(57) ABSTRACT

An electric pepper mill includes a base member with a chamber defined therein and a grind blade is supported in the chamber. A connection shaft extends from the grind blade. A main section has a motor received therein and an output shaft of the motor extends from one end of the main section so that the connection shaft is driven by the output shaft when the main section is connected to the base member. An activation button for activating the motor is connected to the motor. A casing is securely mounted to the main section and the activation button extends from a hole in a top of the casing. The grind blade is activated by pushing the button.

5 Claims, 5 Drawing Sheets

ELECTRIC PEPPER MILL

FIELD OF THE INVENTION

The present invention relates to an electric pepper mill that has a motor driving a grind blade and a button is located at a top of the mill so that the grind blade is activated by pushing the button.

BACKGROUND OF THE INVENTION

A conventional pepper mill generally includes a casing and a shaft is connected to an inside of the casing. A base member is rotatably connected to the lower open end of the casing and a grind blade received in the base member is connected a lower end of the shaft so that a user may hold the base member and rotate the casing to let the grind blade grind the pepper and the ground pepper drop from holes defined through the base member. The conventional pepper mill has to be used by rotating the casing and this requires a certain level of skill and could be inconvenient for some aged persons or children.

The present invention intends to provide an electric pepper mill that is easily to use by pressing the button which activates the motor.

SUMMARY OF THE INVENTION

In accordance with one aspect of the present invention, there is provided an electric pepper mill which comprises a base member having a chamber defined therein and a grind blade is supported in the chamber with a connection shaft extending from the grind blade. A main section having a motor received therein is connected to the base member and an output shaft of the motor extends from one end of the main section and is connected to the connection shaft. An activation button for activating the motor is connected to the motor. A casing is securely mounted to the main section and a hole is defined through a top of the casing so that the activation button extends from the hole.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
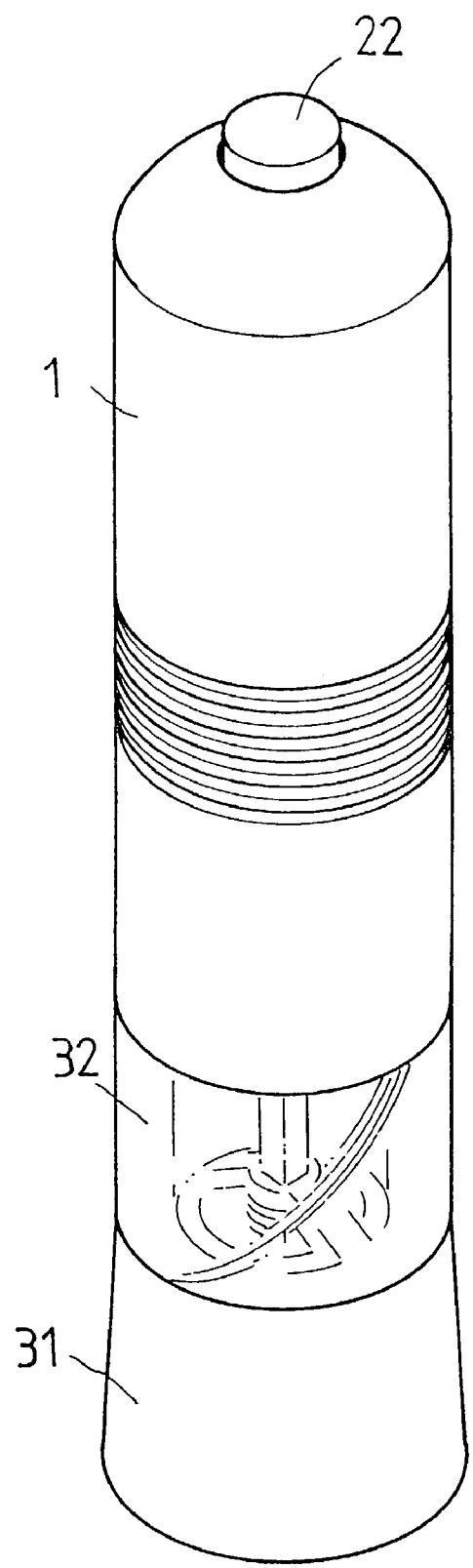
FIG. 1 is a perspective view to show the pepper mill of the present invention.
Figure 2:
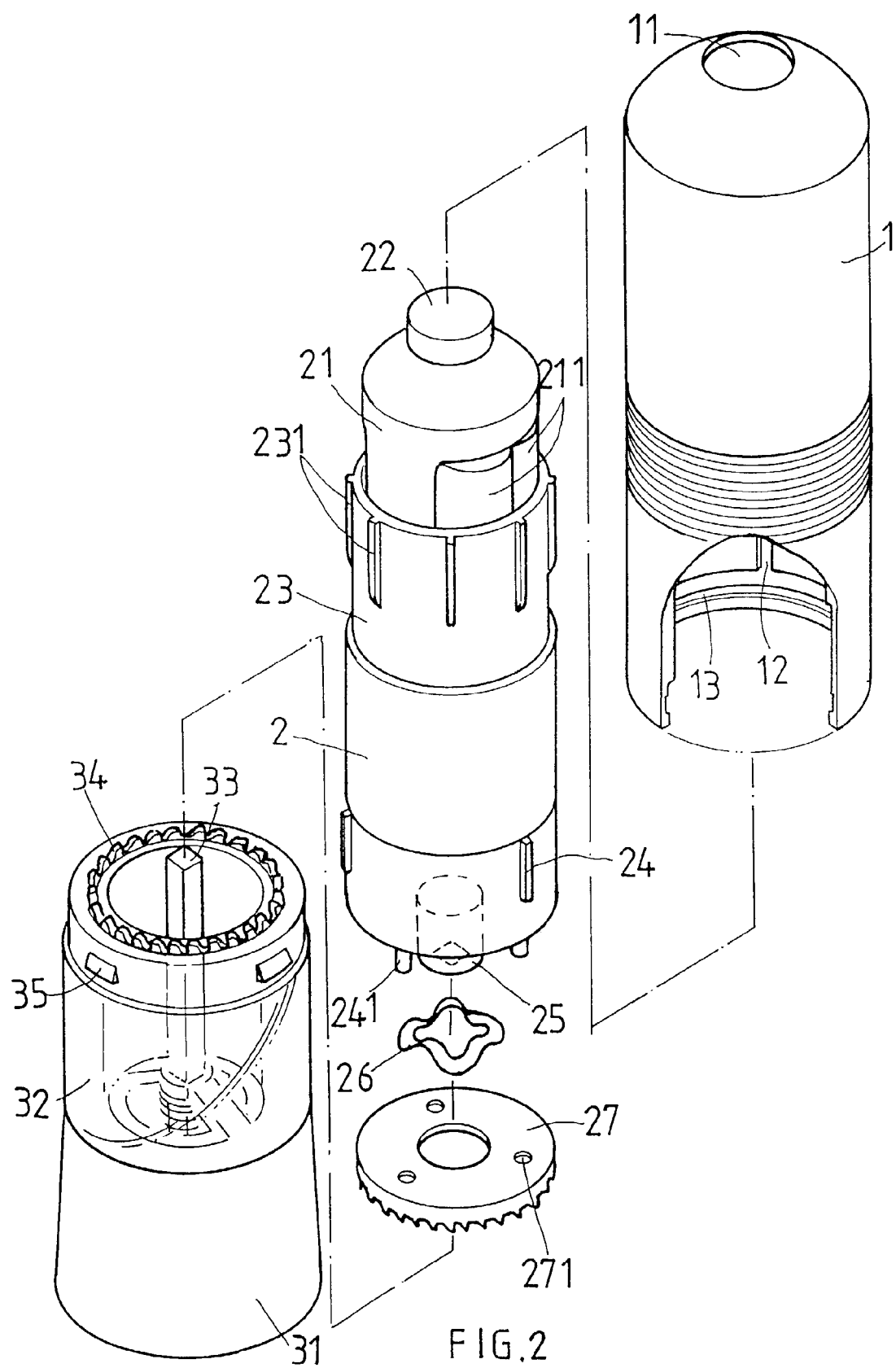
FIG. 2 is an exploded view to show the pepper mill of the present invention.
Figure 3:
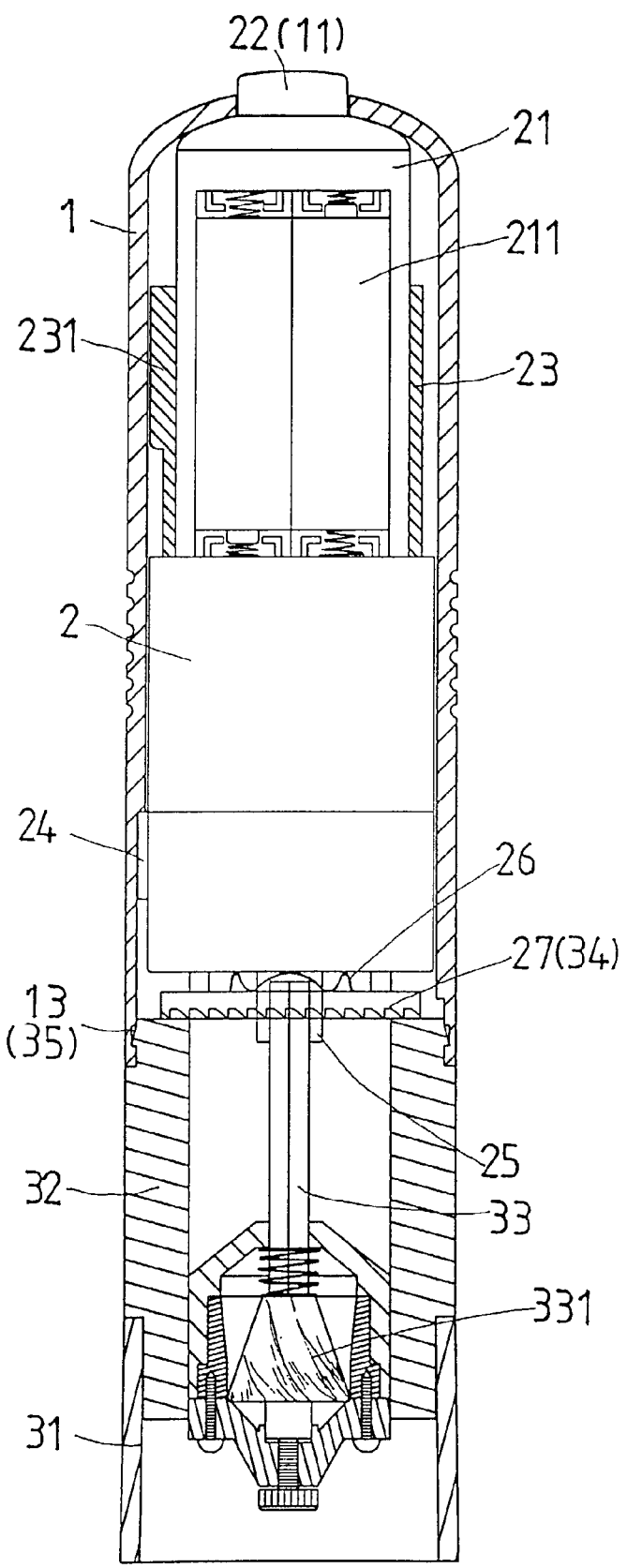
FIG. 3 is a cross sectional view to show the pepper mill of the present invention.

Referring to FIGS. 1 to 3, the pepper mill of the present invention comprises a base member 31 having an open top and an open bottom. A chamber 32 is defined in the base member 31 and a grind blade 331 is supported in the chamber 32 in the base member 311. Gaps are defined between the grind blade 331 and communicate with the open bottom. A connection shaft 33 having a rectangular cross section extends from the grind blade 331. The base member 31 has engaging protrusions 35 extending from an outside thereof and located at the same plane.

A main section 2 has a motor 21 received therein and powered by batteries 211. An activation button 22 for activating the motor 21 is connected to the motor 21. An output shaft 25 of the motor 21 extends from one end of the main section 2. The output shaft 25 has a rectangular recess defined in a distal end thereof and the connection shaft 33 is to be engaged with the rectangular recess in the output shaft 25. An enclosing wall 23 is located around the motor 21 and has reinforcement ridges 21 on an outside of the enclosing wall 23. A plurality of ridges 24 extend longitudinally from an outside of the main section 2.

A biasing ring 26 and a disk 27 are sandwiched between the main section 2 and the base member 31. The disk 27 has a toothed side and biased by the biasing ring 26 toward the base member 31. A toothed top surface 34 is defined in a top of the base member 31 and engaged with the toothed side of the disk 27. The disk 27 has three apertures 271 defined therethrough and a plurality of pins 241 extend from the main section 2. The pins 241 extend through the apertures 271 so as to position the disk 27.

A casing 1 is securely mounted to the main section 2 and a hole 11 is defined through a top of the casing 1. The activation button 22 extends from the hole 11. A plurality of first grooves 12 are defined longitudinally in an inside of the casing 1 and the ridges 24 are engaged with the first grooves 12 so that when rotating the casing 1, the main section 2 is rotated. The casing 1 has a second groove 13 defined radially in the inside of the casing 1 and the protrusions 35 on the base member 31 are engaged with the second groove 13 to allow the casing 1 to be rotated independently relative to the base member 31.

Figure 4:
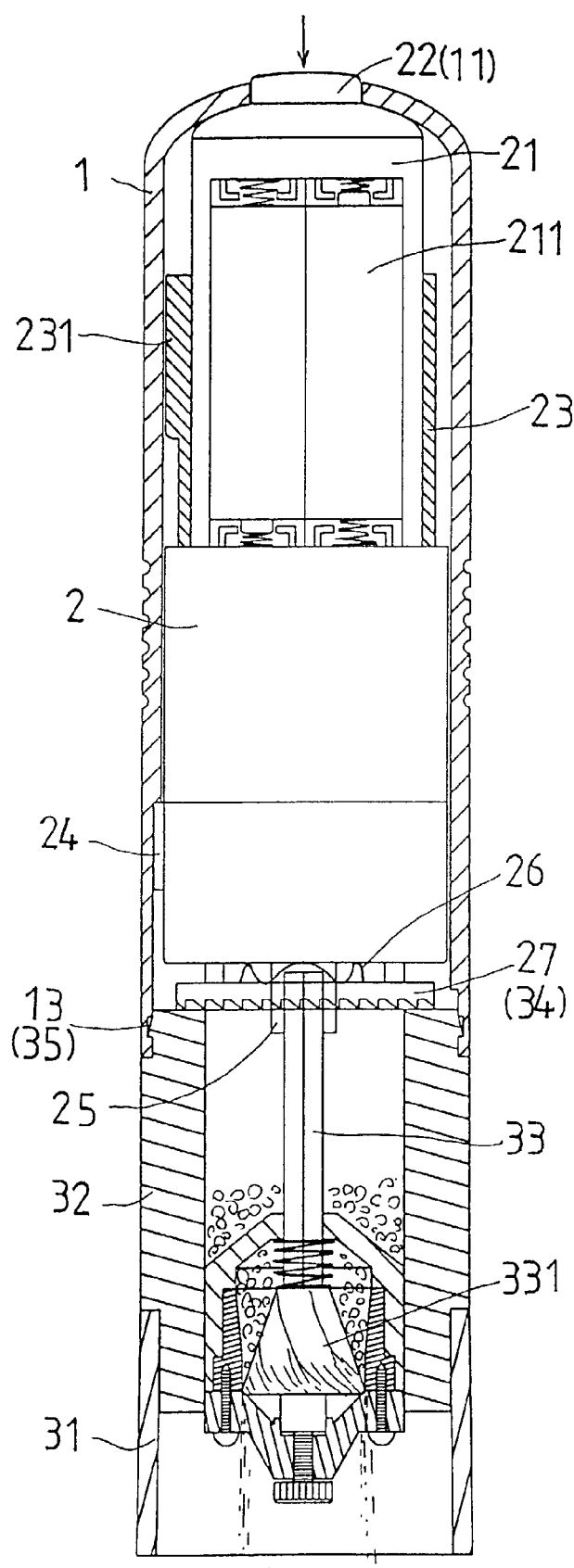
FIG. 4 is a cross sectional view to show the pepper is ground when pushing the activation button of the pepper mill of the present invention.

As shown in FIG. 4, when pushing the activation button 22 on the top of the casing 1, the motor 21 is operated to activate the grind blade 331 to grind the pepper in the chamber 32 and the ground pepper drop from the gaps between the grind blade 331.

Figure 5:
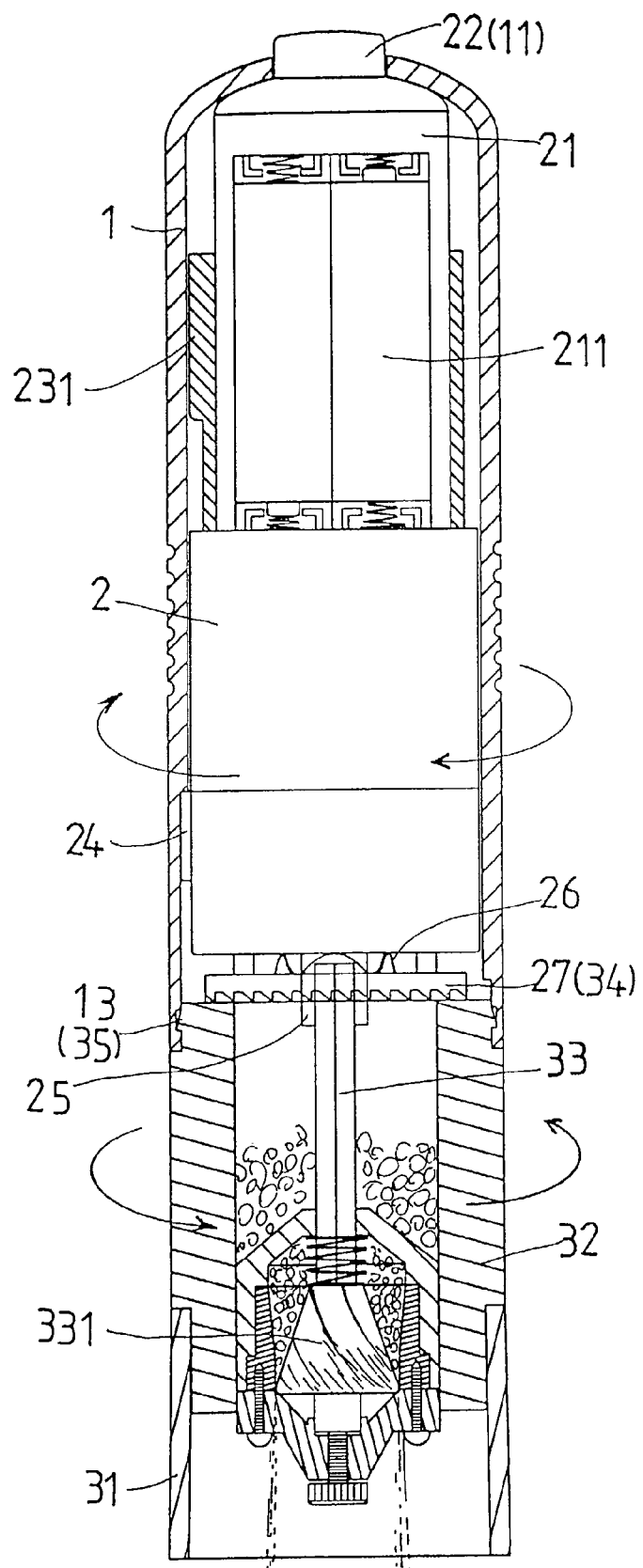
FIG. 5 shows the grind blade can be operated by manually rotating the casing.

Referring to FIG. 5, when the power of the batteries 211 is gone, the user still can rotate the casing 1 manually, because the casing 1 is engaged with the main section 2 by the ridges 24 and the first grooves 12, the output shaft 25 is rotated to rotate the connection shaft 33 and the grind blade 331.

While we have shown and described the embodiment in accordance with the present invention, it should be clear to those skilled in the art that further embodiments may be made without departing from the scope of the present invention.

What is claimed is:

1. An electric pepper mill comprising:
 a base member having an open top and an open bottom, a chamber defined in the base member and a grind blade being supported in the chamber in the base member, a connection shaft extending from the grind blade;
 a main section having a motor received therein and an output shaft of the motor extending from one end of the main section, the main section connected to the base member and the output shaft connected to the connection shaft, an activation button for activating the motor connected to the motor, the main section having a plurality of ridges extending longitudinally from an outside thereof, and a casing securely mounted to the main section and a hole defined through a top of the casing, the activation button extending from the hole, a plurality of first grooves defined longitudinally in an inside of the casing, the ridges engaged with the first grooves so that when rotating the casing, the main section is rotated.

2. The pepper mill as claimed in claim 1, wherein the output shaft has a rectangular recess defined in a distal end thereof and the connection shaft having a rectangular cross section is engaged with the rectangular recess in the output shaft.

3. An electric pepper mill comprising:

a base member having an open top and an open bottom, a chamber defined in the base member and a grind blade being supported in the chamber in the base member, a connection shaft extending from the grind blade;

a main section having a motor received therein and an output shaft of the motor extending from one end of the main section, the main section connected to the base member and the output shaft connected to the connection shaft, an activation button for activating the motor connected to the motor, a casing securely mounted to the main section and a hole defined through a top of the casing, the activation button extending from the hole; and a biasing ring and a disk being sandwiched between the main section and the base member, the disk having a toothed side and biased by the biasing ring toward the base member, a toothed top surface defined in a top of the base member and engaged with the toothed side of the disk.

4. The pepper mill as claimed in claim 3, wherein the disk has apertures defined therethrough and a plurality of pins extending from the main section, the pins extending through the apertures.

5. An electric pepper mill comprising:

a base member having an open top and an open bottom, a chamber defined in the base member and a grind blade being supported in the chamber in the base member, a connection shaft extending from the grind blade, the base member has engaging protrusions extending from an outside thereof and located at the same plane;

a main section having a motor received therein and an output shaft of the motor extending from one end of the main section, the main section connected to the base member and the output shaft connected to the connection shaft, an activation button for activating the motor connected to the motor, and a casing securely mounted to the main section and a hole defined through a top of the casing, the activation button extending from the hole, the casing having a plurality of first grooves defined longitudinally in an inside of the casing, the casing has a second groove defined radially in an inside of the casing, the protrusions engaged with the second groove to allow the casing to be rotated independently relative to the base member.

* * * * *